Patented Feb. 23, 1932

1,846,074

UNITED STATES PATENT OFFICE

ARTHUR ZITSCHER, OF OFFENBACH-ON-THE-MAIN, AND ROBERT SCHMITT, OF DARMSTADT, GERMANY, ASSIGNORS TO GENERAL ANILINE WORKS INC., OF NEW YORK, N. Y., A CORPORATION OF DELAWARE

AZODYESTUFFS INSOLUBLE IN WATER AND PROCESS OF MAKING SAME

No Drawing. Application filed April 3, 1929, Serial No. 352,319, and in Germany April 7, 1928.

The present invention relates to azo dyestuffs insoluble in water and to a process of preparing the same.

We have found that valuable azo dyestuffs insoluble in water are obtained by combining any diazo-, tetrazo- or diazo- azo-compound not containing sulfonic or carboxylic groups with a dihydroxy-quinoline-compound of the probable general formula

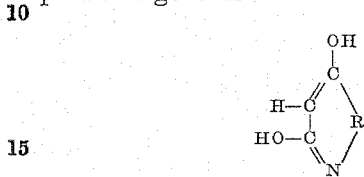

wherein R means an aromatic residue which contains substituents increasing generally the affinity of aromatic compounds to the vegetable fiber. As suitable substituents of this kind may be named: azo, azoxy, thiazole, imidazole, urea or pseudoazimino groups. Such dihydroxy quinoline compounds may be prepared for instance in an analogous manner as described in Berichte der Deutschen Chemischen Gesellschaft, vol. 60 page 1108.

Whereas 2.4-dihydroxy quinoline itself yields useless dyeings when employed for the manufacture of ice-colors, according to our process valuable pigment dyestuffs are obtained by means of the usual substrata, or fast dyeings and printings on the fiber by producing the dyestuffs according to the ice-color method. In consequence of the substantive properties of these combining components the goods padded therewith may be developed without being previously dried.

In order to further illustrate our invention the following examples are given, the parts being by weight and all temperatures in centigrade degrees, but it may be understood that our invention is not limited to the particular products or conditions of reaction mentioned therein.

Example 1

Cotton yarn previously treated in a suitable manner is padded with a solution containing per litre 4 grs. of 1 (2'4'-dihydroxy-6'-quinolyl)-2.3-pheno-triazole of the probable formula

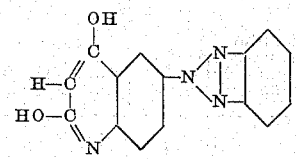

(nearly colorless needles melting above 330°, prepared from 1-(4'-amino-3'-carbethoxy-phenyl)-2.3-pheno-triazole and malonic ester in an analogous manner as described in Ber. d. Deutsch. Chem. Ges., vol. 60, page 1108), 8 ccm. of a caustic soda solution of 34° Bé, 8 ccm. of Turkey red oil and 28 grs. of Glauber's salt. Then it is wrung out and developed in the presence of acetic acid with a solution containing per liter a hundredth molecular proportion of diazotized 3-amino-4.6-dichloro-1-methyl benzene.

In this manner a reddish-yellow dyeing of a very good fastness is obtained. The following table shows the shades of dyeings prepared in like manner from the same padding solution and from the diazo-compounds of the following bases:—

| Base | Shade |
|---|---|
| 4-chloro-2-amino-anisole. | Yellowish-orange. |
| 5-nitro-2-amino-toluene. | Reddish-yellow. |
| 1-amino-anthraquinone. | Deep reddish-yellow. |
| o-amino-azo-toluene. | Brownish red-orange. |
| 5-nitro-2-amino anisole. | Brownish yellow-orange. |

Example 2

Cotton yarn previously treated in a suitable manner is padded with a solution containing per liter 8 grs. of 2.4-dihydroxy-quinoline-6.1'-azo-2'-chloro-benzene of the probable formula

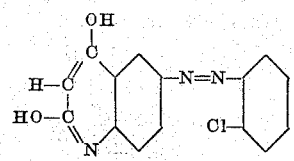

(orange-yellow powder melting above 345°, prepared from 4-amino-2'-chloro-azo-benzene-3-carboxylic acid and malonic ester in an analogous manner as described in Ber. d. Deutsch. Chem. Ges., vol. 60, page 1108), 16 ccm. of a caustic soda solution of 34° Bé, 12 ccm. of Turkey red oil and 28 grs. of Glauber's salt. Then it is well wrung out and developed in the presence of acetic acid with a solution containing per liter a hundredth molecular proportion of diazotized 3-amino-4.6-dichloro-1-methyl-benzene.

In this manner a golden-yellow dyeing of a very good fastness is obtained.

The following table shows the shades of dyeings prepared in like manner from the same padding solution and from the diazo-compounds of the following bases:

| Base | Shade |
| --- | --- |
| 2.5-dichloro-aniline. | Pure yellow. |
| 6-chloro-2-amino-toluene. | Pure yellow. |
| 5-chloro-2-amino-toluene. | Golden-yellow. |
| 4-chloro-2-amino-anisole | Golden-orange. |

We wish it to be understood that in the following claims the term "combining" means everywhere combining in substance or on a substratum especially on the vegetable fiber and that the term "diazotized compound" comprises diazo as well as tetrazo- and diazo-azo-compounds.

We claim:—

1. A process which comprises combining a diazotized compound not containing sulfonic or carboxylic groups with a dihydroxy-quinoline-compound of the probable formula:

wherein R means a residue of the benzene series containing a radical of the group azo, azoxy, thiazole, imidazole, urea or triazole.

2. A process which comprises combining a diazotized compound not containing sulfonic or carboxylic groups with (2'4'-dihydroxy-6'-quinolyl)2.3-pheno-triazole of the probable formula:

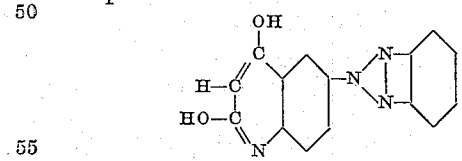

3. As new compounds the azo dyestuffs of the probable general formula:

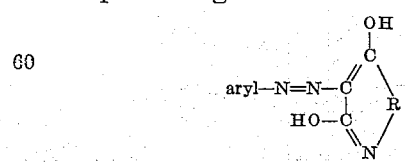

wherein R means a residue of the benzene series containing a radical of the group azo, azoxy, thiazole, imidazole, urea or triazole, which compounds are colored powders, insoluble in water, yielding valuable color lakes or when produced on the fiber fast dyeings and printings.

4. As new compounds the azo dyestuffs of the general probable formula:

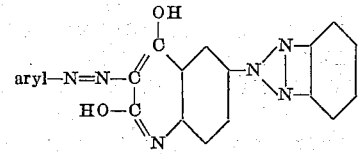

wherein the aryl-group may contain further azo-groups, which compounds are colored powders, insoluble in water, yielding valuable color lakes or when produced on the fiber fast dyeings and printings.

In testimony whereof, I affix my signature.
ARTHUR ZITSCHER.
In testimony whereof, I affix my signature.
ROBERT SCHMITT.